(12) United States Patent
Farhadi

(10) Patent No.: US 8,938,240 B2
(45) Date of Patent: Jan. 20, 2015

(54) SYSTEMS AND METHODS FOR SPECTRUM HANDOFF MANAGEMENT IN WHITE SPACES

(71) Applicant: Fujitsu Limited, Kanagawa (JP)

(72) Inventor: Golnaz Farhadi, Sunnyvale, CA (US)

(73) Assignee: Fujitsu Limited, Kawasaki-shi (JP)

( * ) Notice: Subject to any disclaimer, the term of this patent is extended or adjusted under 35 U.S.C. 154(b) by 71 days.

(21) Appl. No.: 13/736,855

(22) Filed: Jan. 8, 2013

(65) Prior Publication Data

US 2014/0128073 A1    May 8, 2014

Related U.S. Application Data

(60) Provisional application No. 61/721,875, filed on Nov. 2, 2012.

(51) Int. Cl.
*H04W 36/00* (2009.01)
(52) U.S. Cl.
USPC ........ 455/436; 455/452.1; 455/509; 370/329; 370/230; 370/331; 370/336
(58) Field of Classification Search
CPC ...... H04W 16/14; H04W 36/00; H04W 28/00
USPC ............... 455/436, 452.1, 509; 370/329, 230, 370/331, 336, 278
See application file for complete search history.

(56) References Cited

U.S. PATENT DOCUMENTS

| | | |
|---|---|---|
| 2009/0238090 A1 | 9/2009 | Sambhwani et al. |
| 2010/0248739 A1 | 9/2010 | Westerberg et al. |
| 2011/0250916 A1 | 10/2011 | Li et al. |
| 2011/0310866 A1 | 12/2011 | Kennedy et al. |
| 2012/0230250 A1 | 9/2012 | Kasslin et al. |

FOREIGN PATENT DOCUMENTS

WO    WO 2008/088254    7/2008    ............... H04Q 7/36

OTHER PUBLICATIONS

International Search Report and Written Opinion; PCT/US2013/063989; pp. 12, Mar. 17, 2014.
International Search Report and Written Opinion; PCT/US2013/067097; pp. 13, Mar. 24, 2014.
Kumar et al.; "Spectrum Sharing for Next Generation Wireless Communication Networks"; Cognitive Radio and Advanced Spectrum Management; First International Workshop on; IEEE; XP031247475; pp. 4, 2008.
IEEE; "P802.19.1 /DF3.02, Draft STandard for TV White Space Coexistence Methods"; pp. 250, 2012.
Federal Communications Commision; "Second Memorandum Opinion and Order"; pp. 100, 2010.

(Continued)

*Primary Examiner* — David Q Nguyen
(74) *Attorney, Agent, or Firm* — Baker Botts L.L.P.

(57) ABSTRACT

Systems and methods for managing spectrum handoff in a plurality of radio networks are disclosed. These may include gathering a plurality of data about each of the first and second locations; determining a load level associated with each of the first and second set of radio networks; determining a bandwidth allocation value; and reserving a plurality of channel slices from the first channel set among the first of radio networks.

24 Claims, 7 Drawing Sheets

(56) References Cited

OTHER PUBLICATIONS

Mahonen et al.; "Automatic Channel Allocation for Small Wireless Local Area Networks Using Graph Colouring Algorithm Approach"; IEEE 802.11; pp. 536-539, 2004.

Song et al.; "Chapter 2: On the Spectrum Handoff for Cognitive Radio Ad Hoc Networks Without Common Control Channel"; Cognitive Radio Ad Hoc Networks; pp. 37-74, 2011.

Yoon et al.; "Voluntary Spectrum Handoff: A Novel Approach to Spectrum Management in CRNs"; IEEE ICC 2010 proceedings; pp. 5, 2010.

Chen et al.; "A Relay-Assisted Protocol for Spectrum Mobility and Handover in Cognitive LTE Networks"; IEEE Systems Journal, vol. X, No. X; pp. 12, 2011.

Zhang; "Spectrum Handoff in Cognitive Radio Networks: Opportunistic and Negotiated Situations"; IEEE ICC 2009 proceedings; pp. 6, 2009.

Lertsinsrubtavee et al.; "Spectrum Handoff Strategies for Mutiple Channels Cognitive Radio Network"; ACM CoNEXT 2010; pp. 2, 2010.

Moscibroda et al.; "Load-Aware Spectrum Distribution in Wireless LANs"; IEEE 802.11; pp. 10, 2008.

Chieochan et al.; "Channel Assignment Schemes for Infrastructure-Based 802.11 WLANs: A Survey"; IEEE Communications Surveys & Tutorials; vol. 12, No. 1; pp. 124-136, 2010.

Non-Final Office Action, U.S. Appl. No. 13/736,845, 12 pages, May 19, 2014.

SYSTEMS AND METHODS FOR SPECTRUM HANDOFF MANAGEMENT IN WHITE SPACES

RELATED APPLICATION

This application claims benefit under 35 U.S.C. §119(3) of U.S. Provisional Ser. No. 61/721,875, entitled "SYSTEMS AND METHODS FOR COEXISTENCE MANAGEMENT OF SPECTRUM ACCESS," filed Nov. 2, 2012, the entire content of which is incorporated herein by reference.

TECHNICAL FIELD

The present invention relates generally to communication networks and, more particularly, to systems and methods for management of spectrum handoff in whitespace spectra.

BACKGROUND

As the number and types of radio networks proliferate, and the amount of communication carried thereon increases, it has become increasingly important to manage networks comprising radio networks of differing radio access technologies, power limitations, frequency limitations, and other differences. These heterogeneous networks may become increasingly complicated over white space bands. While some solutions have been offered for managing coexistence in whitespace bands, there remains problems concerning the maximization of spectrum re-use as well as spectrum utilization while avoiding interference as well as spectrum variations that require the spectrum handoff.

SUMMARY OF THE DISCLOSURE

In accordance with certain embodiments of the present disclosure, a system for managing spectrum handoff in a plurality of radio networks is disclosed. The management system may include a processor; a neighbor detection engine communicatively coupled to the processor, a load analysis engine communicatively coupled to the processor, a spectrum analysis engine communicatively coupled to the processor, and a channel slicing engine communicatively coupled to the processor. The neighbor detection engine may be configured to gather a first plurality of data associated with a first location and gather a second plurality of data associated with a second location. The load analysis engine may be configured to determine a load level associated with each of a first set of radio networks and a second set of radio networks of the plurality of radio networks, the first set of radio networks comprises radio networks operable over the second channel set at the first location and not the second location and the second set of radio networks comprises radio networks operable over the first and second channel sets. The spectrum analysis engine may be configured to determine a bandwidth allocation value, the bandwidth allocation value based at least on the load level. The channel slicing engine may be configured to generate a channel table at least from the first plurality of data and the second plurality of data, the channel table comprising a first channel set comprising channels of the shared spectrum available at both the first location and the second location; and a second channel set comprising channels of the shared spectrum available at the first location and unavailable at the second location. The channel slicing engine is further configured to reserve one or more channel slices from the first channel set to preserve wireless connectivity for the first set of radio networks.

In accordance with certain embodiments of the present disclosure, a system for spectrum handoff in a plurality of radio networks is disclosed. The system may include a management system and a radio network. The management system may include: a processor; and a neighbor detection engine communicatively coupled to the processor, a spectrum analysis engine communicatively coupled to the processor. The neighbor detection engine may be configured to gather a first plurality of data associated with a first location and gather a second plurality of data associated with a second location. The spectrum analysis engine may be configured to determine a bandwidth allocation value, the bandwidth allocation value based at least on a load level. The radio network may be configured to determine a load level, determine a bandwidth allocation value based at least on the load level, receive the channel table and select a plurality of channel slices from the channel table based at least on the bandwidth allocation value and a score associated with each of the one or more channel slices In accordance with certain embodiments of the present disclosure, a method for managing spectrum handoff in a plurality of radio networks, the plurality of radio networks configured to operate over a shared spectrum is disclosed. The method may include gathering a first plurality of data associated with a first location and a second plurality of data associated with a second location; determining a load level associated with each of the first set and the second set of radio networks; determining a bandwidth allocation value, the bandwidth allocation value based at least on the load level; and reserving a plurality of primary channel slices among the first set of radio networks.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
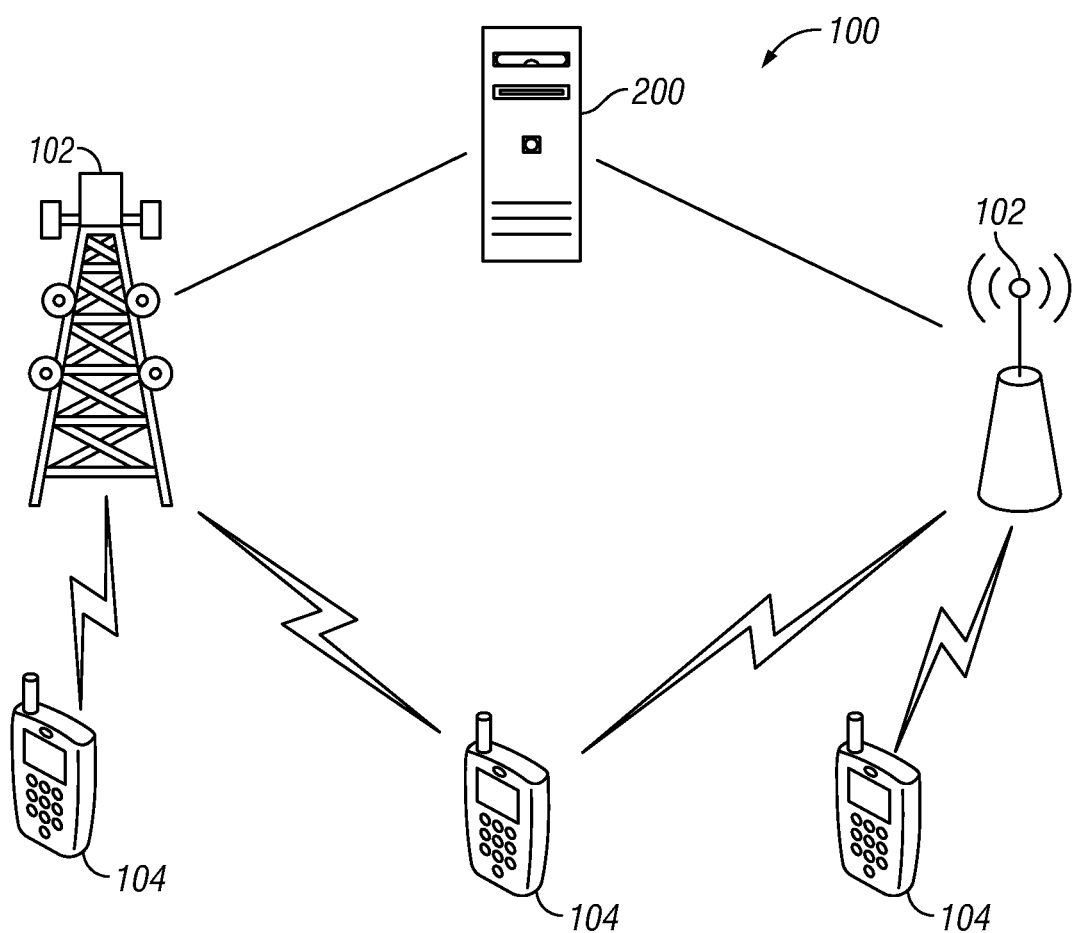
FIG. 1 illustrates an example system for managing spectrum handoff and coexistence in white spaces, in accordance with certain embodiments of the present disclosure.

Preferred embodiments and their advantages are best understood by reference to FIGS. 1 through 8, wherein like numbers are used to indicate like and corresponding parts.

Current environments for electronic devices allow them to move between "locations"—places where the availability of shared spectrum may vary based on location and/or time. As an illustrative example, a mobile access point may move between sets of radio networks. At a first location, the mobile access point may be within interference range of three other radio networks (e.g., networks 1-3), and at the second location the mobile access point may be within interference range of two different radio networks (e.g., networks 4-5). Some set of channels may be available at both locations, while another set may be available at the first location and unavailable at the second. Sharing information among the radio networks in a centralized manner may enable spectrum resource planning for the mobile access point (or any other shared spectrum device moving from one location to another). In our illustrative example, there may be channels "a", "b", "c", "d" available at a current location and channels "a", "b", "e", "f" at a next location. If network 1 (at the first location) requires two channels and the other networks (at the first location and the second location) one channel each, having knowledge of the route of the mobile access point (or other shard spectrum device) may allow a centralized management system to allocate the channels in an efficient manner. For example, at time 0, network 1 (at the first location) may use channels a and b, and reserve a and b for use at the next location. Network 2 may use channel c and Network 3 may use channel d. At the next location, network 4 may use channel e and avoid scheduling in a or b (even if channels a and b may have better quality than channel e, channels a and b have been reserved). Likewise, network 5 may use channel f and avoid scheduling in a or b. Then, when the mobile access point reaches the next location, each network may continue to operate over previously assigned channels without any need for handoff. As described in more detail with reference to FIGS. 1-8, other examples, configurations, and embodiment are described that may more fully illustrate systems and methods for spectrum handoff and coexistence management.

As data traffic growth increases and spectrum becomes increasingly scarce, several solutions have arisen to meet the mobile broadband data demand. One solution may be the deployment of small cells and relays to reuse the licensed spectrum. However, the limited spectrum in the licensed bands may cause too much interference and hence may have poor performance. Similarly, proposals exist to offload some communication over wifi networks. In some cases, this may lead to high congestion in dense areas and issues may arise with, for example, the inherent fixed channelization specified in the IEEE 802.11 technology.

Unlicensed spectra may be available for data communication, including that available within allocated bands when the designated users are not making full use of the allocated spectrum. This unlicensed bandwidth may be generally referred to as "whitespace bands." For example, some additional spectrum has become available in the television ("TV") band and more may be available in the future. When incumbents are not using this band, access is unlicensed and may be used. This spectrum may be referred to generally as the TV white spaces ("TVWS"). Use of whitespace bands however, outlines certain difficulties in managing the coexistence of disparate radio networks in heterogeneous environments. Currently, IEEE 802.19.1 aims at providing a framework to facilitate coexistence management, but this proposal remains in progress.

One purpose of the present disclosure is to allocate spectrum (for example, bandwidth allocation and channel assignments) to each radio network (for example, access points or base stations) sharing the same spectrum band (for example, TV white spaces). Each network may operate based on a different radio access technology (for example, IEEE 802.11 WLAN, IEEE 802.22, or LTE) and may belong to a different operator.

For example, the total amount of spectrum available for shared access (unlicensed/license-exempt) may be denoted by $B_{total}$. This could be a contiguous chunk of spectrum in TV or federal bands or non-contiguous channels in TV or federal bands, and/or some combination of both.

In some embodiments, one goal in spectrum allocation may be to use the white spaces as much as possible while avoiding interference to neighbor networks. In addition, adaptive bandwidth lengths may be allocated to each network proportional to the load requirement of each network. This may provide better utilization of the available unlicensed shared spectrum. In order to support adaptive bandwidth allocation, the entire available spectrum may be divided into slices each of width w Hz.

One method for managing coexistence in a heterogeneous environment may include (1) maximizing spectrum reuse such that as much bandwidth as possible may be allocated to each network, proportional to their load, given the interference constraints; and (2) assigning channel slices based on the bandwidth requirement while avoiding interference to the neighbor networks.

FIG. 1 illustrates an example system 100 for managing coexistence in white spaces, in accordance with certain embodiments of the present disclosure. In some embodiments, system 100 may include a plurality of radio networks 102, one or more user equipment(s) 104, and one or more management system(s) 200 communicatively coupled to radio networks 102. As described in more detail below with reference to FIGS. 2-5, management system 200 may be configured to allocate spectrum (e.g., bandwidth allocation and channel assignments) between or among each of the plurality of radio networks 102 sharing the same spectrum band to allow communication by user equipment 104 across radio networks 102. In some embodiments, management system 200 may be further configured to provide data that may facilitate spectrum allocation by each of the plurality of radio networks 102 sharing the same spectrum band.

In some embodiments, radio network 102 may be an access point to a communication network, the access point configured to allow user equipment 102 to communicate over the communication network. In some embodiments, each radio network 102 shares the same spectrum band as other radio networks 102, while potentially operating on a different radio access technology (e.g., IEEE 802.11, IEEE 802.22, LTE, etc.). Further, each radio network 102 may be owned and/or operated by a different operator. For example, system 100 may include four radio networks 102, including two LTE transmission towers, and two 802.22 wireless access points. In the same or alternative configurations, system 100 may include, more, fewer, or different configurations of radio networks 102 without departing from the scope of the present disclosure.

In some embodiments, user equipment 104 may be an electronic device and/or combination of electronic devices configured to communicate and/or facilitate communication over any or all of the radio networks 102. For example, user equipment 104 may be a cellular telephone, tablet computer, laptop computer, network of other user equipment 104, and/or other appropriate electronic device may be configured to transmit and/or receive data over radio network 102.

In some embodiments, management system 200 may include a number of components configured to allocate spectrum (e.g., bandwidth allocation and channel assignments) between or among each of the plurality of radio networks 102 sharing the same spectrum band to allow communication by user equipment 104 across radio networks 102 and/or provide data that may facilitate spectrum allocation by each of the plurality of radio networks 102 sharing the same spectrum band, as described in more detail below with reference to FIGS. 2-5. As described in more detail below with reference to FIGS. 2-5, management system 200 may include components that may "slice" the total available spectrum to enable adaptive bandwidth allocation between or among a plurality of radio networks 102 in a manner that takes into consideration a load requirement of each radio network 102 as well as interference conditions among radio networks 104 operating different radio access technologies (a "heterogeneous access network").

Management system 200 may be any electronic device or aggregation of electronic devices configured to manage coexistence among neighbor radio networks 102, as described in more detail below with reference to FIGS. 2-5. Although management system 200 is illustrated as a single electronic device, one of ordinary skill in the art would recognize that management system 200 could be a plurality of electronic devices communicatively coupled to one another without departing from the scope of the present disclosure. Further, system 100 may include a plurality of management system 200, as described in more detail below with reference to FIGS. 2-5. For example, some configurations of system 100 may include a plurality of radio networks 102 subscribed to a single management service provided by management system 200 ("centralized service"). Other configurations of system 100 may include a plurality of radio networks 102 managed by a plurality of managements services, provided by a plurality of management systems 200 ("centralized negotiation service"). Still other configurations of system 100 may include a plurality of radio networks that do not subscribe to a centralized management service ("decentralized service").

In operation, there may be a number of access radio networks 102 attempting to access a shared spectrum band within a given area. In such a configuration, it may be necessary or desirable to manage the interference between radio networks 102. For example, in the absence of sufficient coordination among radio networks 102, interference may limit and/or degrade performance of system 100. However, radio networks 102 may be vastly different from one another, including different radio access technologies, power limitations, frequency limitations, etc. As a result, management of spectrum allocation between or among radio networks 102 may result in reduction in interference, more efficient allocation of resources, and better system performance.

Some existing solutions provide for channel assignment in, for example, a wireless local area network ("WLAN") in order to share a 2.4 and/or 5 GHz band. However, such solutions may be limited to allocating one channel to each network with a fixed bandwidth allocation. Other existing solutions provide for channel assignments in a WLAN that may allocate contiguous channels to each access point. However, such solutions may not be readily applicable to a system 100 in which multiple operators control different radio networks 102 and/or a system 100 in which radio networks 102 operate on different radio access protocols. Still other existing solutions provide for management for networks operating over a television white space ("TVWS") band. However, such solutions may not consider adaptive channel assignment to different types of radio networks 102, may not take into consideration the maximization of spectrum allocation in bandwidth allocation, and may not take into consideration spectrum re-use in channel assignment.

Figure 2:
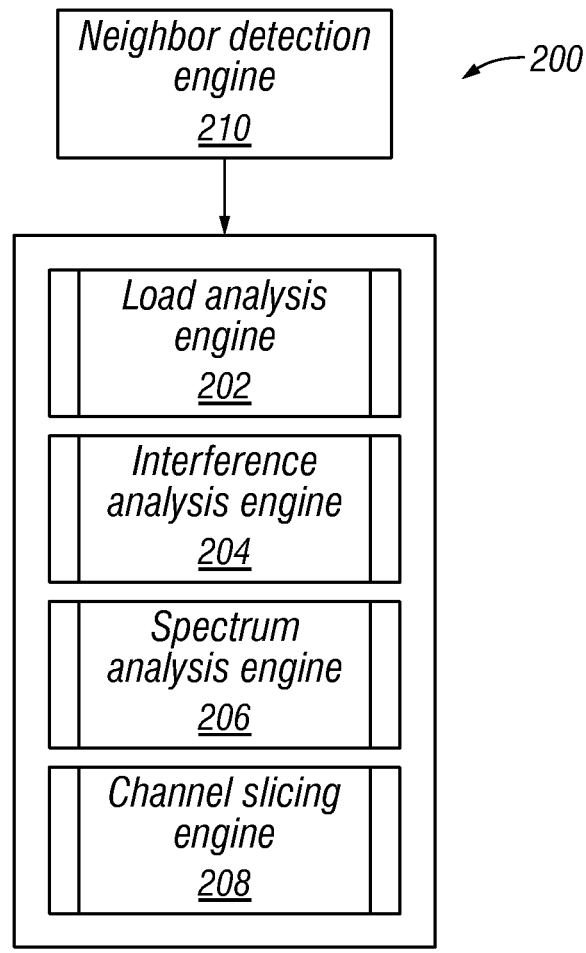
FIG. 2 illustrates an example management system for managing spectrum handoff and coexistence in white spaces, in accordance with certain embodiments of the present disclosure.

FIG. 2 illustrates an example management system 200 for managing coexistence in white spaces, in accordance with certain embodiments of the present disclosure. In some embodiments, management system 200 may include load analysis engine 202, interference analysis engine 204, spectrum analysis engine 206, channel slicing engine 208, and neighbor detection engine 210.

In some embodiments, load analysis engine 202, interference analysis engine 204, spectrum analysis engine 206, channel slicing engine 208, and neighbor detection engine 210 may be one or more components of management system 200, including software, firmware, and/or hardware modules and/or components. Each may be a stand-alone component, a part of a larger component, and/or may be configured differently than that illustrated in example management system 200 without departing from the scope of the present disclosure. For example, each component may reside on one or more servers communicatively coupled to one another, where the one or more server(s) comprise management system 200. Those servers may be colocated and/or remotely located from one another. As another example, all components may be part of management system 200 and/or some components may be instead be part of one or more user(s) 104 and/or radio networks 102.

In some embodiments, neighbor detection engine 210 may be configured to determine the location, nature, and other requirements of the plurality of radio networks 102 sharing a bandwidth. Within management system 200, neighbor detection engine 210 may be configured to receive, process, aggregate, and/or prepare this data for use by management system 200. For example, neighbor detection engine may gather all relevant data from all radio networks 102 and then make that data available to load analysis engine 202, interference analysis engine 204, spectrum analysis engine 206, and/or channel slicing engine 208.

For example, as described in more detail above with reference to FIG. 1 and below with reference to FIG. 3, each radio network 102 may have distinct requirements (e.g., bandwidth, transmission power, system architecture, permissible device types, etc.). In some configurations of management system 200, there may be a plurality of radio networks 102 employing a common radio access technology (e.g., a plurality of 802.22 access points) as well as one or more radio networks 102 employing a different radio access technology. In such configurations, neighbor detection engine 210 may be configured to access information about radio networks 102 from beacon signals advertised from radio networks 102.

Further, as described in more detail below with reference to FIGS. 3-5, management system 200 may be configured to provide data associated with neighbor radio networks 102 to other radio networks 102. For example, in decentralized environments, management system 200 may provide a report to neighbor radio networks 102 sufficient to allow radio networks 102 to determine bandwidth and channel assignment without making a centralized decision regarding bandwidth and channel assignment. In both centralized and decentralized environments, neighbor detection engine 210 may be configured to gather radio network data in order to make it available to other components of management system 200.

In some embodiments, management system 200 may be configured to be compatible with standards regarding coexistence management. For example, IEEE 802.19.1 provides an example coexistence management architecture wherein a centralized system may acquire information regarding each radio network 102 (e.g., load requirements, access technology, location, etc.). Management system 200 may be configured to provide this information to the plurality of radio networks 102 sharing a common spectrum within system 100. For example, each radio network 102 may subscribed to a service provided by management system 200 wherein management system 200 provides channel assignments within the shared spectrum. As an additional example, management system 200 may provide information that may be associated with channel selection at each radio network 102.

In some embodiments, load analysis engine 202 may be configured to analyze the current load (e.g., available capacity) on each radio network 102 within system 100. Load analysis engine 202 may be configured to assist management system 200 in allocating adaptive bandwidth lengths to each radio network 102 proportional to the load requirement of each radio network 102. For example, load analysis engine 202 may analyze data received at neighbor detection engine 210 as described in more detail above. Load analysis engine 202 may be configured to derive data associated with the load of each radio network of system 100, as described in more detail below with reference to FIGS. 3-5. The load may be the total number of users associated with radio network 102, a sum data rate that radio network 102 is configured to support, or any other appropriate identifier of the network load. Load analysis engine 202 may make this data available to interference analysis engine 204, spectrum analysis engine 206, channel slicing engine 208, and/or neighbor detection engine 210.

In some embodiments, interference analysis engine 204 may be configured to analyze the current level of interference between or among the plurality of radio networks 102. Interference analysis engine 204 may make use of data made available by neighbor detection engine 210 to determine whether a given radio network 102 may be within transmission range of, and/or interfering with, another radio network 102, as described in more detail below with reference to FIGS. 3-8.

After determining the set of radio networks 102 that may share the same spectrum band, interference analysis engine 204 may make data associated with this analysis available to spectrum analysis engine 206, channel slicing engine 208, neighbor detection engine 210, and/or load analysis engine 202 of management system 200.

In some embodiments, spectrum analysis engine 206 may be configured to determine an optimal bandwidth allocation between or among radio networks 102 of system 100, as described in more detail below with reference to FIGS. 3-8. Spectrum analysis engine 206 may make use of data made available by neighbor detection engine 210, load analysis engine 202, and interference analysis engine 204 to determine the optimal bandwidth allocation.

After determining the optimal bandwidth allocation, spectrum analysis engine 206 may make data associated with this analysis available to channel slicing engine 208, neighbor detection engine 210, load analysis engine 202, interference analysis engine, and/or spectrum analysis engine 206 of management system 200.

In some embodiments, channel slicing engine 208 may be configured to allocate the bandwidth of the shared spectrum between or among the various radio networks 102 of system 100, as described in more detail below with reference to FIGS. 3-8. Channel slicing engine 206 may make use of data made available by neighbor detection engine 210, load analysis engine 202, interference analysis engine 204, and/or spectrum analysis engine 206 to allocate the bandwidth.

In some embodiments, channel slicing engine 208 may be configured to allocate bandwidth in a manner that may avoid interference by assigning orthogonal channels to neighbor networks such that the required bandwidth identified by spectrum analysis engine 206 may be achieved, as described in more detail below with reference to FIGS. 3-5.

In operation, management system 200 is configured to provide a centralized repository for data associated with neighbor radio network 102. In addition—as described above and in more detail below with reference to FIGS. 3-5—management system 200 may also be configured to provide centralized coexistence management services to a plurality of radio networks 102. In some embodiments, radio networks 102 may be configured to be centrally serviced by management system 200. For example, all radio networks 102 may be subscribed to one management system 200. In such configurations, management system 200 may signal to each radio network 102 which portion of the spectrum to use, as described in more detail below with reference to FIG. 3. The channel assignment may be either contiguous or non-contiguous.

Figure 3:
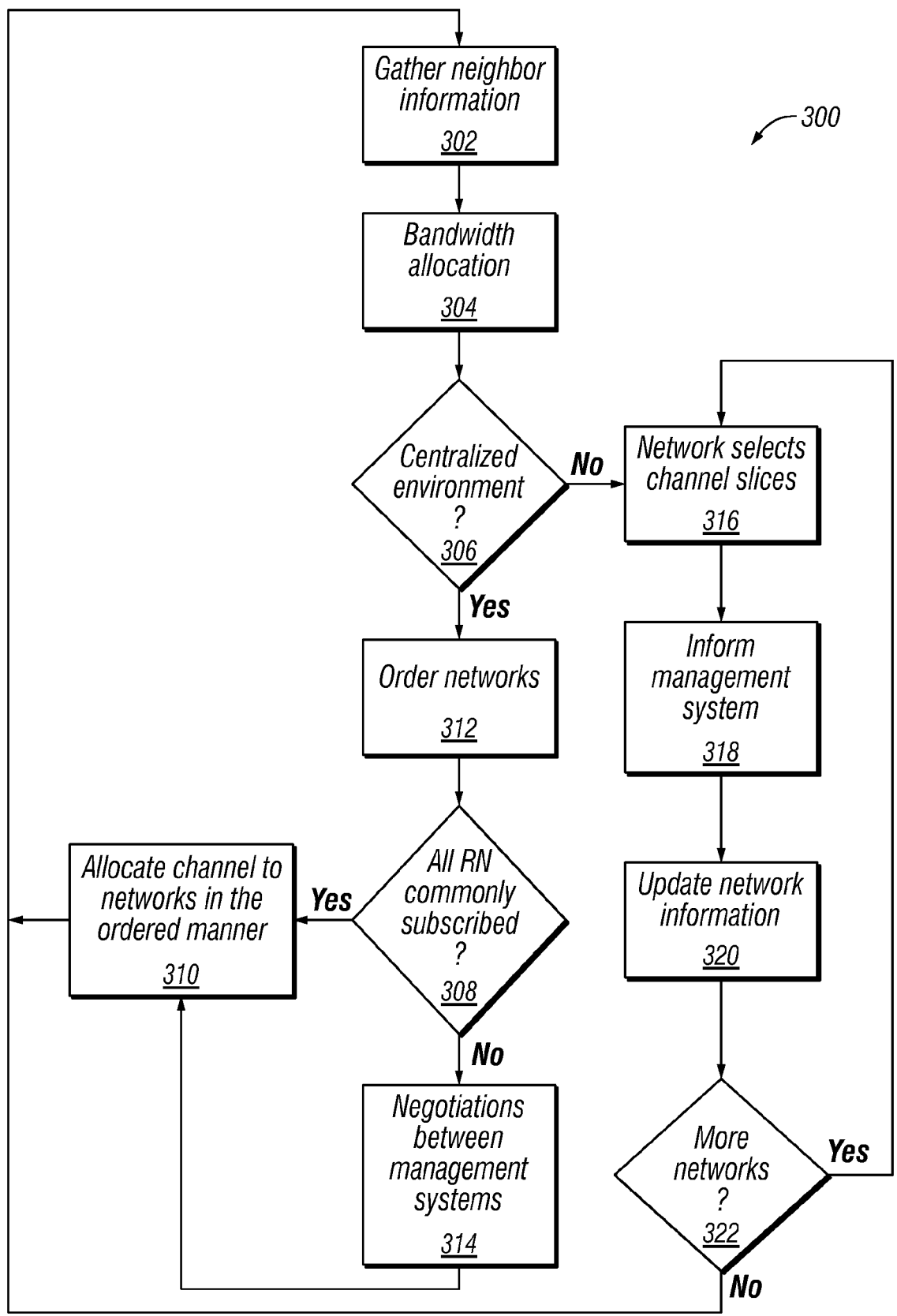
FIG. 3 illustrates a flowchart of an example method for managing coexistence in white spaces, in accordance with certain embodiments of the present disclosure.

FIG. 3 illustrates a flowchart of an example method 300 for managing coexistence in white spaces, in accordance with certain embodiments of the present disclosure. Method 300 may include determining whether a system is centralized, determining whether all radio networks are commonly operated, gathering neighbor network information, allocating bandwidth to the radio networks, and assigning channels.

According to one embodiment, method 300 preferably begins at step 302. Teachings of the present disclosure may be implemented in a variety of configurations. As such, the preferred initialization point for method 300 and the order of steps 302-322 comprising method 300 may depend on the implementation chosen.

At step 302, method 300 may gather information about neighbor radio networks 102, as described in more detail above with reference to FIGS. 1-2 and below with reference to FIGS. 4-5. Information about radio networks 102 may include the type of radio access technology, power limitations, frequency limitations, etc. As described in more detail below with reference to FIG. 4, this data may be aggregated into a report, e.g., a CXReport.

In some configurations, one piece of data that may be gathered is the set of channels that may be reused. In the example formulas provided below, the term "$I_u$" is used to denote the load of network u, where u is one of the plurality of radio networks 102. In the example formulas provided below, "G" denotes an interference graph where the plurality of radio networks 102 may be represented as vertices of the graph. In some configurations, if there is an edge between two radio networks 102, then the two networks may be within interference range of one another. Interference analysis engine 204 may be further configured to analyze the interference data to determine what portion of the spectrum may be reused.

For example, a graph G may represent a number N of radio networks 102 within system 100. N(u) may then be used to denote the set of radio networks 102 interfering with network u of the plurality of radio networks 102 within system 100. N(u) may be split into two subsets: $N_R(u)$ and $\tilde{N}(u)$. $N_R(u)$ may be a subset of radio networks 102 neighboring network u whose allocated channel slices may be reused by some other neighbor networks of u. $\tilde{N}(u)$ may be a subset of radio networks 102 neighboring network u that can reuse the channels allocated to the networks in $N_R(u)$ (the "neighbor reuse subset"). The pseudo-code provided below illustrates one example method for determining the set $\tilde{N}(u)$. In the example provided,

```
for u = 1 : N
    v ∈ N(u)
    Ñ(u) = φ
    C_u = cardinality (N(u))
        for i = 1, . . . , C_u – 1
            if v_i ∉ Ñ(u)
                for j = i + 1, . . . , C_u
                    if E_ij = C
                    {
                        Ñ(u) ← v_j
                        N_R(u) ← v_i
                        reusePair ← (v_i,v_j) // the pair of networks
                                                that can reuse the same
                                                channel slices
                    }
                    j = j + 1
                end
                i = i + 1
        end
    u = u + 1
end
```

In some configurations, there may arise a worst-case complexity of the exhaustive search, denoted by $O(N^3)$—polynomial time complexity. Different algorithms may be used to enhance the time complexity. In some configurations of system 100, however, the number of radio networks, N, deployed in a dense urban area is typically less than 100 or 200 per 100×100 m² area. The exhaustive search may therefore be feasible for this density.

After data has been gathered, method 300 may proceed to step 304. At step 304, method 300 may determine an optimal bandwidth allocation between or among radio networks 102 of system 100.

In the example formulas provided below, $P_u$ may be used to denote a maximum power that network u may be permitted to transmit over a white space band. This power level may be determined by regulation, for example. $B_u$ may be used to denote the bandwidth allocated to network u, creating a vector B, where B is equal to $[B_1, \ldots, B_N]$. $B_{total}$ may be used to denote the total amount of bandwidth available for system 100.

$$\max_B \sum_{u=1}^{N} B_u \qquad \text{FORMULA 1}$$

$$\text{subject to } B_u \geq \alpha f_u(load_u) B_{total}, \forall u \qquad \text{FORMULA 2}$$

$$B_u + \sum_{v \in N_R(u)} B_v \leq B_{total}, \forall u \qquad \text{FORMULA 3}$$

In some embodiments, spectrum analysis engine 206 may be configured to analyze spectrum data in accordance with FORMULA 1 above. In some configurations, this may serve to maximize the spectrum re-use. In order not to overload a given radio network 102, spectrum analysis engine 206 may be further configured to constrain this allocation via an analysis of FORMULA 2. This constraint may ensure that each radio network 102 gets a "fair share" of spectrum for its load requirement. In some configurations, the constraint is tuned by means of the parameter α. α may be characterized as a tradeoff between fairness between or among radio networks 102 and spectrum utilization. Additionally, the constraint of FORMULA 2 makes use of the formula f(load), described in more detail below with reference to FORMULA 4.

$$f_u(load) = \frac{L_u}{\left(L_u + \sum_{v \in N_R(u)} (L_v)\right)} \qquad \text{FORMULA 4}$$

As described in more detail above with reference to FIGS. 1-2, system 100 may include a plurality of radio networks 102 with different power limits over the spectrum to be shared. For example, a 4-Watt base station may coexist with a 100-mWatt access point. In such configurations, the load function denoted above in FORMULA 4 may be modified to include a power mismatch $$\left(\text{e.g., by replacing } L_u \text{ with } \frac{L_u}{P_u}\right).$$

The combination of α and f(load) may be understood collectively as a "bandwidth sharing index," as described in more detail above with reference to FIGS. 1-2.

In some embodiments, there may be a further constraint, as illustrated above with reference to FORMULA 3. This constraint may ensure that the total bandwidth allocated to a given network and its neighbors (that do not belong to the network neighbor reuse subset) does not exceed the total available bandwidth. This constraint may enable orthogonal channel assignment to neighbor networks, potentially avoiding interference. Further, this constraint may increase spectrum utilization by considering for reuse those networks that are not within interfering range of one another.

The bandwidth optimization problem described above with reference to FORMULAS 1-4 delineates a linear programming problem. Varying the parameter α may achieve different tradeoffs between fairness and spectrum utilization. The value of parameter α may also be determined such that the worst node performance is maximized, as illustrated below in FORMULA 5.

$$\max_{\alpha, B} \alpha \qquad \text{FORMULA 5}$$

$$\text{subject to } B_u \geq \alpha f_u(load_u) B_{total}, \forall u$$

$$B_u + \sum_{v \in N_R(u)} B_v \leq B_{total}, \forall u$$

After determining the optimized bandwidth allocation, method 300 may proceed to step 306. At step 306, method 300 may determine whether the radio networks 102 of system 100 are part of a centralized environment. As described in more detail above with reference to FIGS. 1-2, radio networks 102 may subscribe to a common, centralized management service provided by management system 200. In other configurations, radio networks 102 may subscribe to a plurality of management services, resulting in a centralized negotiation service. If system 100 is a centralized environment, method 300 may proceed to step 308. If system 100 is a decentralized environment, method 300 may proceed to step 316.

At step 308, method 300 may order radio networks 102 according to a predetermined order. Depending on the desired configuration of management system 200, this may be done in a variety of ways. For example, radio networks 102 may be ordered based on radio access technology (e.g. WLAN first because of the potential contiguous channel assignment requirement), load requirement (e.g., heavily loaded first), a round robin fashion, and/or any suitable ordering criteria. In some configurations, the ordering may not relate directly to a characteristic of a given network. For example, management system 200 may order radio networks 102 according to a DSATUR-type algorithm. In this example, the graph-coloring algorithm establishes the order in which networks must be colored and which colors (i.e. noninterfering frequencies) to assign. At each iteration of the algorithm, the network with a higher saturation degree (i.e. the node with a larger number of colored neighbors in the interference graph) is selected to be colored. If more than one node has the same saturation degree, the one with the highest ordinary degree (i.e. the node with larger number of neighbors) is selected. If the draw persists, then a random selection may be performed. The color assigned to the selected network is the lowest channel not being used on any of its neighbors. This type of may be also modified, for example, to color networks based on 802.11 first and then based on their saturation degree. After ordering radio networks 102, method 300 may proceed to step 310.

At step 310, method 300 may determine whether radio networks 102 of system 100 are commonly subscribed to the same management system. As described in more detail above with reference to FIGS. 1-2, radio networks 102 may be commonly subscribed to the same management system. If radio networks are commonly subscribed, method 300 may proceed to step 314. If they are not, method 300 may proceed to step 312.

At step 314, method 300 may assign channels of the shared spectrum to the plurality of radio networks 102. In some embodiments, the total available spectrum may be divided into slices of bandwidth w. For example, this channel slice bandwidth may correspond to a subcarrier bandwidth (e.g., in an Orthogonal Frequency-Division Multiple Access ("OFDMA") network) or 180 kHz corresponding to one Long Term Evolution ("LTE") resource block. In some embodiments, channel slicing engine 208 may be configured to analyze the optimized bandwidth for data indicating that a channel should only be used for a portion of the time required (e.g., when the result of the linear programming problem described in more detail above results in non-integer solutions) and to assign channels accordingly.

For the purposes of illustration, ChannelSet=(all channel slices) and ChannelSliceAllocated$_u$ may be the set of channel slices allocated to network u. The list of available channel slices for u may then be defined as ActiveChannelSet$_u$=ChannelSet−[ChannelSlicesAllocated$_j \forall j \in N(u)$ and j<u]. In some embodiments, this ActiveChannelSet$_u$ may include a full slice or a fraction of a slice shared in time between two neighbor networks. A ReuseSet$_u$ may also be defined as the union over all channel slices allocated to the networks that may re-use the shared spectrum are reusable and neighbors to network u: ReuseSet$_u = \cup_{k\ reusePair\ of\ u}$ ChannelSlicesAllocated$_k$.

The following pseudo-code illustrates an example method for determining the channel assignment. Although this example is used, other methods may be understood by one of ordinary skill in the art without departing from the scope of the present disclosure.

1: order the networks (e.g. based on their load, random ordering, etc.)
2: for u = 1:N -continued for $b_u = 1:n_u = $ ceiling$\left(\frac{B_u}{w}\right)$
    assign the slice with the best score from the slices in the set
    ActiveChannelSet$_u \cap$ ReuseSet$_u$ (including time sharing)
      if Cardinality (ActiveChannelSet$_u \cap$ ReuseSet$_u$) < n$_u$,
      continue to assign the slices from the set
      ActiveChannelSet$_u$ until the B$_u$ bandwidth is allocated
      to the network u (including time sharing)
    end
  update the ActiveChannelSet$_{u+1}$
  update the ReuseSet$_{u+1}$
end In some embodiments, the score associated with each channel slice may be a function of one or more characteristics of the slice including: channel quality (e.g., higher score for a better channel signal-to-noise ratio), frequency range (e.g., higher score for being at the lower portion of the frequency band), and/or contiguity (e.g., higher score for contiguous channel slices). For example, channel slices allocated based solely on a channel quality score may result in the use of non-contiguous channels, potentially leading to fragmentation of the carrier components.

In order to be consistent with standard specifications that support carrier aggregation, each channel slice should not be smaller than the minimum carrier component supported. For example, if all radio networks 102 operate based on LTE technology, the channel slice should be at least 1.4 MHZ (the minimum carrier component supported in LTE). Networks with different access technologies could also access the band. For example, the current IEEE 802.11 WLAN standard (e.g. 802.11af for extending WLAN over TVWS bands) supports channelization of at least 5 MHZ. As such, channel slices of 5 MHZ bandwidth are required to support non-contiguous carrier aggregation. In urban areas with limited number of white spaces this requirement leads to inefficient/unfair usage of the spectrum.

For example, to increase the fairness and better utilize available spectrum, more finely granular channel slices may be desirable. In order to enable smaller channel slice bandwidth, the bandwidth allocated to each WLAN access point may be smaller than the nominal channel bandwidths specified by the IEEE 802.11 standard (e.g., 5, 10, and 20 MHZ channelization and/or their aggregate combinations). However, in order to avoid large peak-average power ratios ("PAPR") with an OFDM signal (thus requiring expensive amplifiers), contiguous channel slices may be preferable. Thus, for a heterogeneous network setting with mixed LTE and WLAN technologies sharing the same channel, the channel slices can be as small as 1.4 MHZ given that contiguous channel slices are assigned to WLAN. For the setting where multiple WLANs (from different operators) share the channel, the channel slice could be as small as one subcarrier length, taking into account the same contiguous channel assignment requirement.

Although, one example method of implementing coexistence management, through bandwidth allocation and channel assignment, has been illustrated through FORMULAS 1-5 above and their accompanying text, one of ordinary skill in the art would recognize that other methods may be used without departing from the scope of the present disclosure. For example, as described in more detail above, some configurations of management system 200 may assign channels in a manner such that one channel does not carry data for an entire time segment ("time-sharing"). However, some configurations of system 100 may not be readily adaptable to time-sharing. For example, if radio networks 102 are operated by different operators, and/or implement different radio access technologies, scheduling and/or synchronization may not be supported. In such configurations, the bandwidth allocation problem described in more detail above with reference to FORMULA 5, may be modified as illustrated below with reference to FORMULA 6.

$$\max_n \sum_{u=1}^{U} n_u \quad \text{FORMULA 6}$$

subject to $n_u \geq \alpha f_u(load_u)S, \forall u$ $$n_u + \sum_{v \in N_R(u)} n_v \leq S, \forall u$$

In the above example, S may be understood to be $$S = \frac{B_{total}}{w},$$

or the total number of slices. In FORMULA 6, $n_u$ may only take an integer value such that an integer number of slices may be assigned to network u, creating a vector n, where n is equal to $[n_1, n_2, \ldots, n_N]$. FORMULA 6 represents an integer linear programming problem. A solution to the relaxed linear programming problem described with respect to FORMULA 4 may provide an upper bound on the integer linear programming problem described with respect to FORMULA 6. FORMULA 6 may then be solved using branch-and-bound, and/or other numerical techniques.

After assigning the channels, method 300 may return to step 302 to begin the process again.

Referring again to step 310, if all radio networks 102 are not commonly subscribed, method 300 may proceed to step 312. At step 312, method 300 may undergo negotiations between or among the plurality of management systems 200 managing the plurality of radio networks 102. Negotiations may include messaging between or among the plurality of management systems 200. For example, since networks were ordered at step 308, an "Ordering" message that notifies the order of networks for channel assignment when multiple management servers are involved may be required. For example, this may be included e.g. in the "NegotiationInformation" exchanged between management systems 200 in the IEEE 802.19.1 standard, As a further example, a next step in channel assignment may be to make sure that no duplicate channel slice has been allocated to the neighbor networks. As such, management system 200 may be configured to notify other management systems 200 of the list of channels that have already allocated so that the other entity calculates the activeChannelSet (described in more detail below with reference to FIG. 5) for the networks subscribed to it. The ReuseSet (described in more detail below with reference to step 314) for these radio networks 102 may then be determined. For example, the message exchange for the list of allocated channels corresponding to each radio network 102 under management of each management system 200 may be carried in "NegotiationInformation" signal through e.g. "ListofSupportedFrequncies" (along with, in some embodiments, a minimum channel slice bandwidth parameter) or similar data type in the 802.19.1 standard. After concluding the negotiations, method 300 may proceed to step 314.

Referring again to step 306, if method 300 determines that system 100 is a decentralized environment, method 300 may proceed to step 316. At step 316, method 300 may have each radio network 102 select appropriate channel slices, as described in more detail below with reference to FIG. 4. Once slices are selected, method 300 may inform management system 300 of the changes, as described in more detail below with reference to FIG. 4. Once management system 200 has been informed, method 300 may proceed to step 320.

At step 320, method 300 may update data associated with a given radio network 102, as described in more detail below with reference to FIG. 4. Once this data is updated, method 300 may proceed to step 322. At step 322, method 300 may determine whether more radio networks 102 should be analyzed. If so, method 300 may return to step 316. If not, method 300 may return to step 302 to begin the process again.

In some embodiments, the steps of method 300 may be performed by some or all of the components of system 100, as described in more detail above with reference to FIGS. 1-2 and below with reference to FIGS. 4-5. For example, in some configurations, neighbor detection engine 210 may be responsible for gathering and reporting data on neighboring radio networks 102. In other configurations, these steps may be performed by different components of system 100 without departing from the scope of the present disclosure.

Although FIG. 3 discloses a particular number of steps to be taken with respect to method 300, method 300 may be executed with more or fewer steps than those depicted in FIG. 3. For example, in some embodiments, the channel assignment described in more detail above with reference to step 314 may be iterative process for which negotiation may be revisited as the channel assignment for each radio network 102 is instituted. In addition, although FIG. 3 discloses a certain order of steps comprising method 300, the steps comprising method 300 may be completed in any suitable order. For example, in the embodiment of method 300 shown, the determination of whether system 100 is a centralized environment is done prior to the channel assignment and after bandwidth allocation. However, in some configurations, the determination of environment may be done prior to any other steps being performed.

Figure 4:
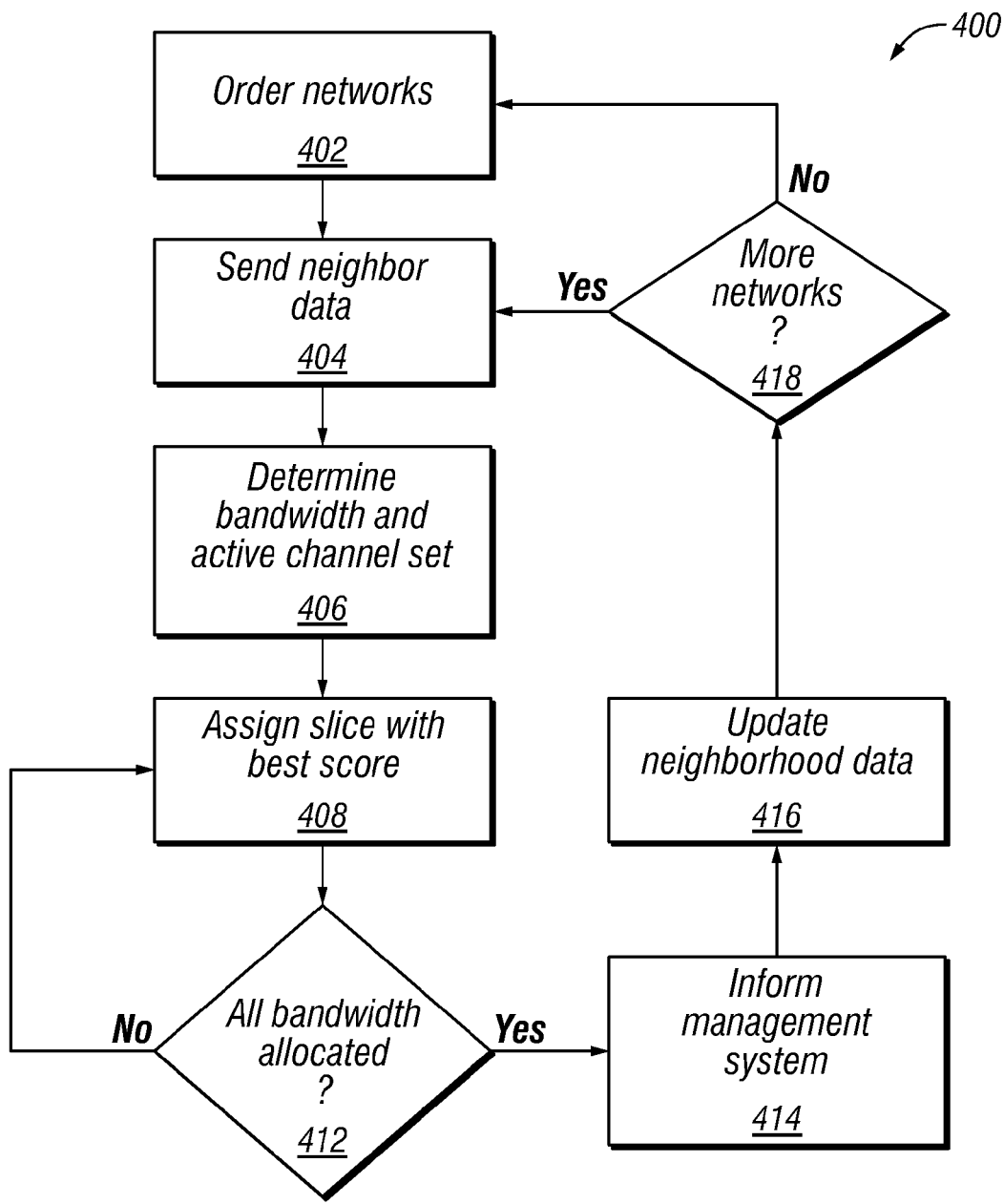
FIG. 4 illustrates a flowchart of an example method for a sequential, distributed channel assignment for a decentralized radio network system, in accordance with certain embodiments of the present disclosure.

FIG. 4 illustrates a flowchart of an example method 400 for a sequential, distributed channel assignment for a decentralized radio network system, in accordance with certain embodiments of the present disclosure. FIG. 4 includes ordering networks, sending neighbor data, determining bandwidth and active channel sets, assigning scores to slices, checking the bandwidth requirements, and informing the management system of the updated data.

According to one embodiment, method 400 preferably begins at step 402. Teachings of the present disclosure may be implemented in a variety of configurations. As such, the preferred initialization point for method 400 and the order of steps 402-416 comprising method 300 may depend on the implementation chosen. Generally, the steps of method 400 may correspond to steps 316-322 of method 300, as described in more detail above with reference to FIG. 3.

At step 402, method 400 may order the various radio networks 102, as described in more detail above with reference to FIGS. 1-3. After order the networks, method 400 may proceed to step 404. At step 404, method 400 may communicate data associated with the neighborhood of radio networks 102 to each radio network 102 in the ordered manner. In some embodiments, this data may include a list of interfering networks, their operating parameters, bandwidth sharing index value, minimum channel slice bandwidth, reuse set, etc. After sending this data, method 400 may proceed to step 406.

In some decentralized environments, for example, management system 200 may provide a report (e.g., a "central service report" or "CXReport") on the interfering networks, as described in more detail above with reference to FIGS. 1-3. This report may contain data associated with the networks' operating frequencies, access technology, interference level, etc. In some embodiments, the report may also include a recommended bandwidth value and/or a bandwidth sharing index, obtained from spectrum analysis engine 206, as described in more detail above with reference to FIG. 3. This data may be used as an indication of how much bandwidth may be fair for each radio network 102 to use.

At step 406, method 400 may determine the optimal bandwidth and the active channel set. For example, using bandwidth factors received from management system 200, each radio network 102 may determine how much bandwidth it can use that leads to an efficient usage of the channel and potentially not to interfere with neighbor radio networks 102. Without the bandwidth information from management system 200, each radio network 102 may locally determine the bandwidth for its operation—e.g. relevant to its load—and may incorporate the knowledge about its neighbor radio networks 102. Each radio network 102 may make a decision on the operating parameters and send data back to management system 200. For example, each radio network 102 may select the set of channel slices that minimizes an interference cost or have the best channel quality (e.g., a greedy algorithm). Such greedy distributed channel assignment could potentially result in interference between two neighbor radio networks 102. In order to avoid this problem, for the next unit of time, when CXReport is updated, each radio network 102 may receive data associated with its performance that may lead to a better decision making (e.g., via reinforcement learning) and may converge to an "orthogonal" channel assignment.

After determining the optimal bandwidth and active channel set, method 400 may proceed to step 408. At step 408, method 400 may begin assigning the slices with the best score from the slices in the active channel set. Channel scores are described in more detail above with reference to FIGS. 1-3. In some embodiments, slices with the best score may be those from the set ActiveChannelSet$_u$∩ReuseSet$_u$, as described in more detail above with reference to FIGS. 1-3. As a result, these may be the first assigned. In some embodiments, method 400 may also include selecting a channel slice bandwidth as part of the channel assignment process. For example, using slice bandwidth factors received from management system 200, each radio network 102 may determine an appropriate channel slice bandwidth. For example, slice bandwidth data may be received as part of a report from management system 200 (e.g., a CXReport). As another example, channel slice bandwidth may be assumed to be a minimum carrier component supported by neighbor radio networks 108, as described in more detail above with reference to FIG. 3.

Once a slice with the best score has been assigned, method 400 may proceed to step 412. At step 412, method 400 may determine whether all of the bandwidth $B_u$ has been allocated to network u. If it has, then method 400 may proceed to step 414. If it has not, method 400 may return to step 408. If more slices are needed to fulfill the bandwidth requirement, method 400 may select additional slices until the bandwidth requirement is met.

Referring again to step 412, if all bandwidth has been allocated, method 400 may proceed to step 414.

At step 414, method 400 may inform management system 200 of the slices selected before proceeding to step 416. At step 416, method 400 may update the data associated with the neighborhood of radio networks 102 before proceeding to step 416. At step 416, method 400 may determine whether additional radio networks 102 require updated neighborhood data. In some embodiments, method 400 may send the updated data associated with the neighborhood of radio networks 102 to the next radio network 102 in the order of radio networks 102. The data may subsequently be passed among a set of radio networks 102. If more networks require the neighborhood data, method 400 may return to step 404. If no more networks require the neighborhood data, method 400 may return to step 402.

Although FIG. 4 discloses a particular number of steps to be taken with respect to method 400, method 400 may be executed with more or fewer steps than those depicted in FIG. 4. In addition, although FIG. 4 discloses a certain order of steps comprising method 400, the steps comprising method 400 may be completed in any suitable order. For example, in the embodiment of method 400 shown, the determination of whether system 100 is a centralized environment is done prior to the channel assignment and after bandwidth allocation. However, in some configurations, the determination of environment may be done prior to any other steps being performed.

Figure 5:
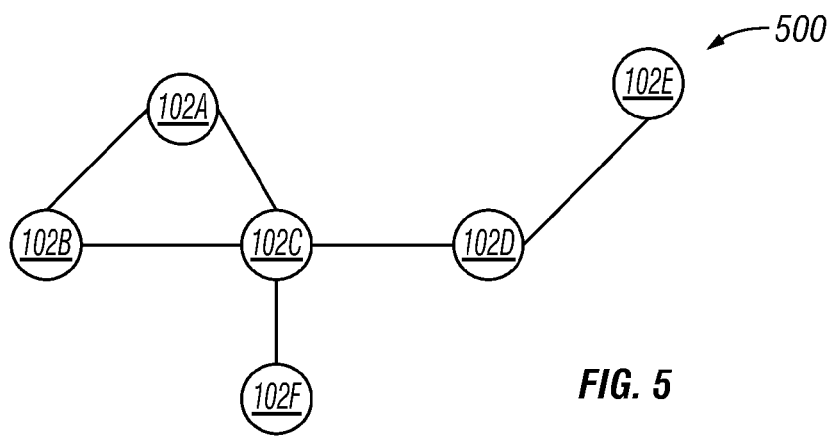
FIG. 5 illustrates an example graph representing an example system including a plurality of radio networks, in accordance with certain embodiments of the present disclosure.

FIG. 5 illustrates an example graph 500 representing an example system 100 including a plurality of radio networks 102, in accordance with certain embodiments of the present disclosure. FIG. 5 is provided as an illustrative example of coexistence management in order to aid in understanding. It should not be understood to limit the scope of the present disclosure.

Graph 500 includes a plurality of radio networks 102. In the example graph 500, system 100 includes six radio networks 102, denoted 102A-102F. The lines between each of the nodes on the graph indicate whether the two nodes connected by such line are potentially interfering with one another. For example, radio networks 102A and 102B are potentially interfering, while radio networks 102A and 102E are not.

Applying the methodology described in more detail above with reference to FIGS. 1-4, a set of networks interfering with each radio network 102 may be establish. Additionally, a neighbor reuse subset may also be determined for each of radio network 102. For example, these sets are listed below for each of the example radio networks 102A-102F, wherein the subscripts for each correspond to the letter denoting the particular radio network 102.

| | |
|---|---|
| N(A) = {2, 3} | Ñ(A) = ∅ |
| N(B) = {1, 3} | Ñ(B) = ∅ |
| N(C) = {1, 2, 4, 6} | Ñ(C) = {4, 6} |
| N(D) = {3, 5} | Ñ(D) = {5} |
| N(E) = {4} | Ñ(E) = ∅ |
| N(F) = {3} | Ñ(F) = ∅ |

As described in more detail above with reference to FIGS. 1-4, this may allow a determination of the set of reuse pairs. From radio network 102C, it may be determined that the set of reuse pairs are (4,1), (4,2), (6,1), and (6,2). Likewise, from radio network 102D, the set may be expanded to include (5,3).

The set of reuse pairs may then be applied to a bandwidth optimization problem, as described in more detail above with reference to FIGS. 1-4. For example, this may maximize the spectrum utilization, constrained by a fairness factor described in more detail above with reference to FIGS. 1-4, as well as constrained by total bandwidth allocated to a network and its neighbors that do not belong to the reuse subset.

Beginning with the maximization problem, the above-identified reuse subset, and an assumed $B_{total}$ of 6 MHz, the bandwidth for each radio network 102A-102F may be determined in this example to be:

| | | |
|---|---|---|
| $B_A = 2$ | $B_B = 2$ | $B_C = 2$ |
| $B_D = 3$ | $B_E = 3$ | $B_F = 4$ |

In the case of radio networks 102D, 102E, the total bandwidth at those nodes is greater than 6 MHz, and the allocated bandwidth is therefore constrained. Totaling these numbers together gives a total bandwidth value of 16, allow a spectrum reuse value of 16/6. One of ordinary skill in the art may appreciate that this reuse value is an improvement over some prior solutions.

Turning next to the channel allocation problem, and assuming six slices of 1 MHz each (denoted as a, b, c, d, e, and f), graph 500 may provide an example of slicing among radio networks 102A-102F. In the below example calculations, the ActiveChannelSet described in more detail above with reference to FIGS. 1-4 may be denoted as $A_u$, wherein the "u" denotes the particular radio network 102 referenced. Likewise, the ReuseSet described in more detail above with reference to FIGS. 1-4 may be denoted as $R_u$, and the ChannelSlicesAllocated described in more detail above with reference to FIGS. 1-4 may be denoted as $C_u$. In the example provided, radio networks 102A-102F have been ordered as follows: 102A, 102B, 102D, 102C, 102E, 102F.

102A: $A_A$={a,b,c,d,e,f}=>$C_A$={a,b}
  $R_A$=Ø
102B: $A_B$={c,d,e,f}=>$C_B$={c,d}
  $R_B$=Ø
102D: $A_D$={a,b,c,d,e,f}=>$C_D$={a,b,c}
  $R_D$={a,b,c,d}
102C: $A_C$={e,f}=>$C_C$={e,f}
  $R_C$=Ø
102E: $A_E$={d,e,f}=>$C_E$={d,e,f}
  $R_E$={e,f}
102F: $A_F$={a,b,c,d}=>$C_F$={a,b,c,d}

Figure 6:
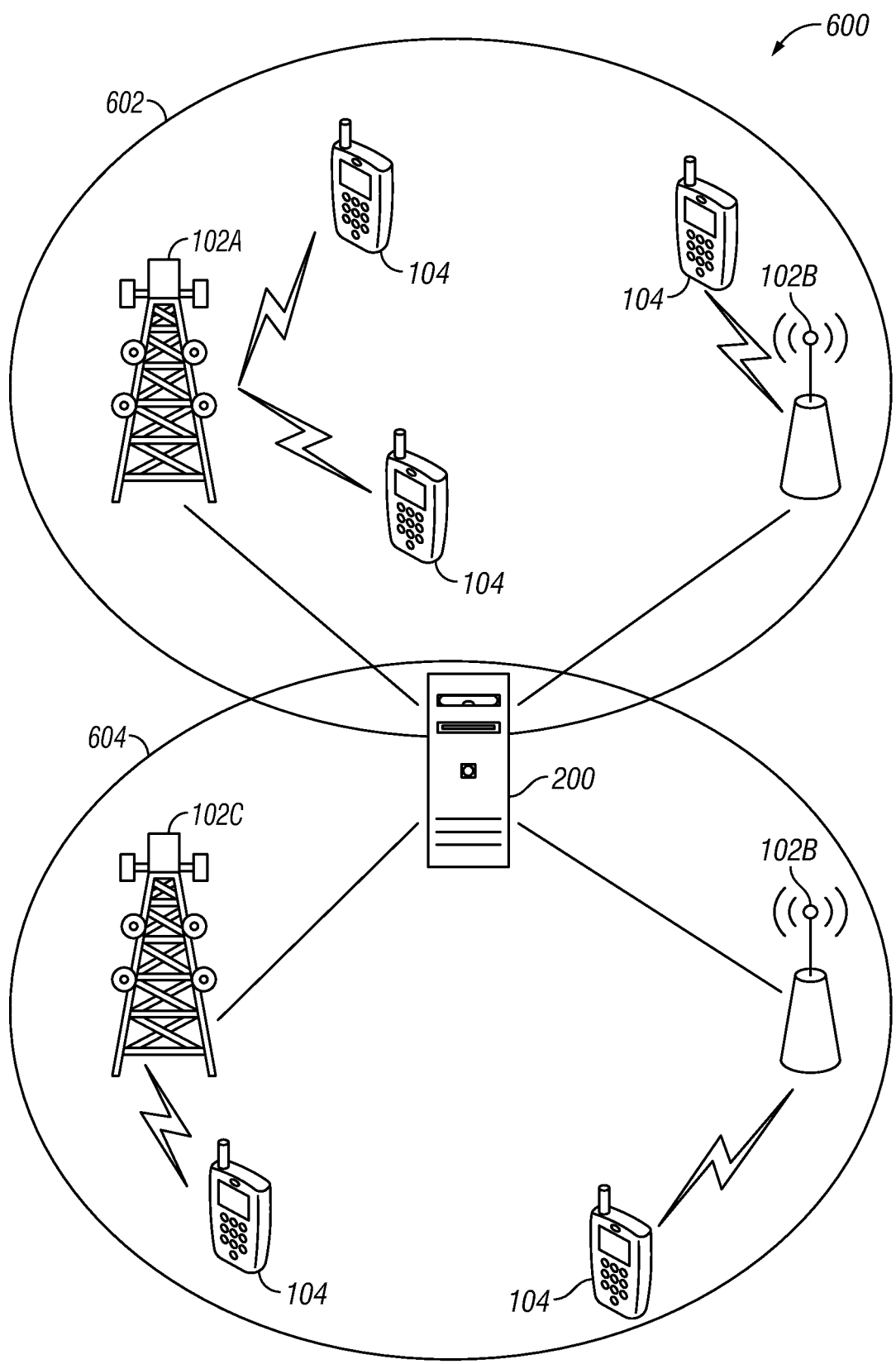
FIG. 6 illustrates an example system for managing spectrum handoff and coexistence management in white spaces, in accordance with certain embodiments of the present disclosure.

FIG. 6 illustrates an example system 600 for managing spectrum handoff and coexistence management in white spaces, in accordance with certain embodiments of the present disclosure. In some embodiments, system 600 may include management system 200 and a plurality of radio networks 102. In some embodiments, the plurality of radio networks 102 may include one or more radio networks 102A, 102B at location 602, and one or more radio networks 102B, 102C at location 604. For example, system 600 may include one or more radio networks 102 that may be different between locations 602, 604 and/or one or more radio networks 102B that may move from location 602 to location 604.

In some embodiments, as described below, features of the present disclosure may also be applicable for spectrum handoff management which may be required given the temporal and/or spatial variations inherent in whitespaces. For example, mobile networks (e.g. mobile access points or relays mounted on a train) that operate in white spaces may be required to switch to another spectrum band as they move (e.g., a move from location 602 to location 604). This is because the white space spectrum availability depends on the time and the location. For example, at a given instant of time, the channel available at location 602 may not be available at location 604. Hence, spectrum handoff may be implemented to avoid interference to the primary users. However, this may result in interruptions in communications and dropped packets and hence poor user experience for the secondary networks.

It should be noted that, although they are referenced as "locations" 602, 604, the systems and methods described herein may be applicable to temporal changes of and/or to the whitespaces that comprise a channel at a current time (denoted by location 602) may be reclaimed by a primary user at a next time (denoted by location 604) for the same physical location.

One approach to avoid spectrum handoff for mobile networks due to unavailability of the band at the next location may be to obtain a list of channels from a database for multiple locations in order to, for example, learn about channels that may be available within an area. FCC regulation currently mandates operation on the channels available for the entire area. This may provide seamless connectivity for the network. However, since there are fewer channels in the overlap area, the throughput performance degrades due to the smaller bandwidth available for communications. Alternatively, the mobile network may get the list of location for multiple areas around its current location to learn channel availability for multiple locations.

In some embodiments, a white space object ("WSO") may request a list of channels from an outer radius toward an inner radius. For example, for locations with different radii starting from $l_0+r_N, \ldots, l_0+r_0, l_0$ where $r_N > \ldots > r_1 > r_0$, WSO may obtain a list of channels for multiple locations, for example to build a look-up table, and may still be able to operate on the available channels on its location. This may facilitate the decision making on which channel to use based on the list of channels obtained to have a tradeoff between seamless connectivity and throughput. However, this may impose a large overhead for database access for every new location (every 60 sec.) as well as overhead for database access for multiple radii around each new location.

As described in more detail above with reference to FIG. 1, a WSO may be an individual electronic device and/or a network of electronic devices. For example, a WSO may include user equipment 104 and/or radio network 102. In some configurations, for example, a WSO may include a plurality of user equipment 104 as well as an access point for radio network 102.

In some embodiments, for example, the case where a WSO has a predefined route with a known mobility pattern, this radius may be calculated beforehand and pre-configured. The same or alternative embodiments may include a WSO storing a list of channels for multiple locations and time stamps. For example, for TV white spaces, channel availability variations in time may be relatively stationary and hence the look-up table stored may provide a good estimate of which channels will be available for the next location.

In some embodiments including a WSO with more dynamic mobility patterns and routes, access to a database including channel availability, location, or other relevant information may be shifted to a central management entity (e.g., management system 200), which may be configured to fetch the list of channels for multiple locations, store those values, and then perform data analytics for better decision making on channel assignment for the networks under its management. In some embodiments, if the WSO provides its mobility information to management system 200, management system 200 may not only estimate the position of location 604 but may also estimate the total network load on the shared spectrum at the next time stamps. In the same or alternative embodiments, channel assignment taking into account mobility of a given radio network 102 may avoid reconfiguration of resources for other neighbor radio networks 102 in order to adapt their bandwidth and/or switch to other channel(s) according to new conditions.

In some embodiments, one purpose may be to achieve a balance between seamless connectivity, throughput, and overhead through intelligent channel assignment among networks based on the knowledge of spectrum variations in time and/or location (e.g., via mobility information). In such configurations, coexistence management may further incorporate spectrum handoff management. For example, this may be done with the objectives of avoiding spectrum handoffs and/or avoiding spectrum handoff for other radio networks 102 that may interfere with a mobile WSO at its next location.

A variety of examples may be provided below for further understanding of the present disclosure. For example, different cases on how mobility information may help with channel assignment are described. Furthermore, the examples described below illustrate how the WSO may provide its mobility information to management system 200 in an IEEE 802.19.1 system.

In a first example, management system 200 may only provide data to radio networks 102. In this example, decision making on channel assignment may be performed locally at each radio network 102. In such a configuration, management system 200 may fetch a list of channels for multiple regions around user equipment 104 and then send the list of channels for location 602 with a tag. In some embodiments, the WSO may only be allowed to operate on the channels it has received for a given location/radius. Management system 200 may tag a channel as: (1) Primary: for example, referring to channels being available at location 604 (where location 604 may represent a physical location at a particular time, as described in more detail above), or (2) Secondary: for example, referring to channels that will become unavailable (i.e. primary user is present) at location 604.

Radio network 102 may make a decision on how much bandwidth may be required for its load and which channels to choose accordingly. In some embodiments, the WSO may divide the total available spectra into multiple channel slices and only use a few number of those slices based on its load requirement (as well as Bandwidth Sharing Index with the other interfering networks, as described in more detail above with reference to FIGS. 1-5). Having the knowledge of primary and secondary channel tags, radio network 102 may choose channels from the primary band. The channel assignment may, in some embodiments, be based on a reward function that may assign a higher value to slices of the primary band so there may be a degree of stickiness to these bands.

For example, a lightly loaded network requiring less bandwidth than the primary band ("P-band") spectrum may use channels slices from P-bands. Alternatively, a heavily loaded network requiring more bandwidth than the P-band spectra may use P-band as the primary channel and slices from secondary bands ("S-band") for aggregation/bonding to achieve a desired throughput. In other examples, if a lightly loaded, but S-band, network has much better quality (for example, less interference on that band) a network may use one slice from P-band for seamless connectivity and other slices from S-band for throughput.

As an illustrative example to aid in understanding, assume channels 22 and 23 that have been tagged as primary and secondary channels, respectively. Radio network 102 may divide the band into 4 channel slices of bandwidth 3 MHz. If the bandwidth to meet the load requirement for this radio network 102 is 3 MHz, then radio network 102 may choose the first slice from the channel 22 even if the slices from channel 23 have a better quality in terms of signal to noise ratio (SNR), for example, a higher reward for the connectivity. If the bandwidth required for the load of radio network 102 is 9 MHz, then two slices may be chosen from channel 22, and one slice may be chosen from channel 23. This may be viewed as carrier aggregation in LTE where the slice in channel 23 acts as a secondary cell to increase the throughput and may be deactivated easily without interrupting the connectivity of user equipment 104.

In a second example, management system 200 may be configured to provide centralized management services to radio networks 102 at locations 602, 604 (where locations 602, 604 may represent two different physical locations and/or a physical location at two different times, as described in more detail above. In the management service, management system 200 may decide how much bandwidth to allocate to each radio network 102 and which channels to allocate to each radio network 102. In the context of the ordering of networks generally, described in more detail above with reference to FIGS. 1-5, ordering may further incorporate spectrum variations in location and/or time for radio networks 102. In these embodiments, management system 200 may assign channels as described in more detail below with reference to FIG. 7.

In a third example, the WSO may be subscribed to a management system 200 configured to be compatible with the IEEE 802.19.1 As described in more detail above, mobility information may lead to a more effective decision on channel assignment so as to achieve a balance between seamless connectivity, network throughput, and signaling overhead. However, communicating mobility information parameters about the WSO to management system 200 may not be supported in some versions. WSO mobility information parameters may include user equipment speed, direction, or mobility state (for example, no mobility, low/moderate/high mobility determined based on some thresholds, etc.). WSO mobility information may be forwarded to management system 200 in a variety of situations. For example, it may be forwarded during: (1) Registration, for example, in commands such as "GetRegInfo.response" primitive; "CERegistrationRequest," where CE is the enabler that interfaces user equipment 104 to management system 200; "CMRegistrationRequest;" user equipment Type, ID; etc. (2) Resource reconfiguration, for example, in mobility status/information, such as "ResourceReconfigurationRequest" to the CE; "ResourceReconfigurationRequest" to management system 200. (3) Information requests, for example, management system 200 may be able to request mobility information and user equipment 104 may be able to provide it to management system 200. Such mobility information may be included in the following: "reqInfoDescrElement" from CE to user equipment 104; and "reqInfoValueType" from user equipment 104 to CE.

In some configurations, management system 200 may obtain measurement from radio networks 102 under its subscription. Thus, WSO mobility measurement capability may be supported in IEEE 802.19.1. Also, a user equipment mobility report, including, but not limited to information such as speed, direction, or mobility state, may be added to enable management system 200 to configure reports on mobility.

Figure 7:
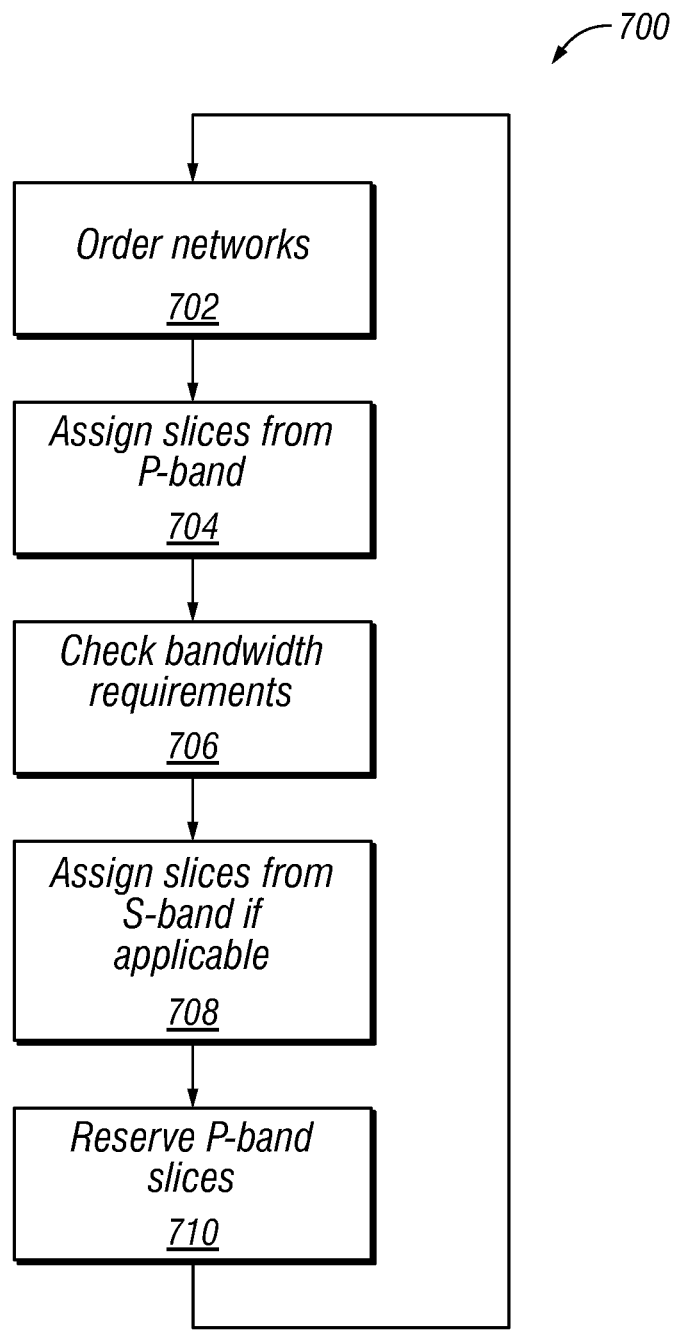
FIG. 7 illustrates a flowchart of an example method for assigning channels for mobile spectrum handoff and coexistence management in a centralized environment, in accordance with certain embodiments of the present disclosure.

FIG. 7 illustrates a flowchart of an example method 700 for assigning channels for mobile spectrum handoff and coexistence management in a centralized environment, in accordance with certain embodiments of the present disclosure. Method 700 includes ordering the networks, reserving slices of P-band and supplementing with slices of S-band.

According to one embodiment, method 700 preferably begins at step 702. Teachings of the present disclosure may be implemented in a variety of configurations. As such, the preferred initialization point for method 700 and the order of steps 702-710 comprising method 700 may depend on the implementation chosen.

At step 702, method 700 may begin ordering the networks. For example, method 700 may establish $Set_a$ as the set of networks for which the whitespace bands are available at location 604 and $Set_u$ as the set of networks for which the whitespace bands are unavailable at location 604. After establishing these initial sets, method 700 may then order the networks according to the results of establishing $Set_a$ and/or $Set_u$. After ordering the networks, method 700 may proceed to step 704.

At step 704, method 700 may assign slices from the P-bands at location 602. In some embodiments, method 700 may assign a number of slices from the P-band such that every network in $Set_u$ maintains its connectivity. For example, method 700 may assign a number of slices equal to $$\frac{\text{\# of P-band slices}}{\text{\# of interfering network} \in Set_u}.$$

After assigning slices from the P-bands, method 700 may proceed to step 706.

At step 706, method 700 may check the bandwidth requirements and/or constraints on a contiguous channel. Method 700 may then proceed to step 708, where method 700 may assign slices from the S-band at location 602 to meet the bandwidth required in aggregation with the assigned slices from the P-bands. Method 700 may then proceed to step 710.

At step 710, method 700 may then reserve the same slices as those allocated above at location 604 if possible. This may include, in some embodiments, assigning slices from other bands to other radio networks 102. Channel reservation may be applicable in a number of configurations of system 600.

For example, in some configurations, a WSO may only operate on the overlap channels, for example, P-bands, because it has requested the list of channels for a region according to FCC regulations. In such an embodiment, management system 200 may reserve those slices to be assigned to a WSO.

In some embodiments, the steps of method 700 may be performed by some or all of the components of system 100, as described in more detail above with reference to FIGS. 1-6. For example, in some configurations, neighbor detection engine 210 may be responsible for gathering and reporting data on neighboring radio networks 102. In other configurations, these steps may be performed by different components of systems 100, 600 without departing from the scope of the present disclosure.

Although FIG. 7 discloses a particular number of steps to be taken with respect to method 700, method 700 may be executed with more or fewer steps than those depicted in FIG. 7. For example, in some embodiments, a decision at time t for the networks at locations $L_1, \ldots, L_n$ may be based on a prediction on the traffic load at the later times due to appearance of a WSO at these locations. This may include a dynamic programming approach for the channel assignment with a reward function that awards stickiness to a channel slice and penalizes switching to another channel slice.

In the same or alternative embodiments, with the knowledge of network mobility information, the traffic load on the wireless backhaul may also be estimated allowing for more intelligent channel assignment for the base stations providing the backhauls connectivity.

In addition, although FIG. 7 discloses a certain order of steps comprising method 700, the steps comprising method 700 may be completed in any suitable order. For example, in the embodiment of method 700 shown, the steps of method 700 are illustrated as happening sequentially. However, in some configurations of a centralized environment, different steps may be occurring at different times for different radio networks 102.

Figure 8:
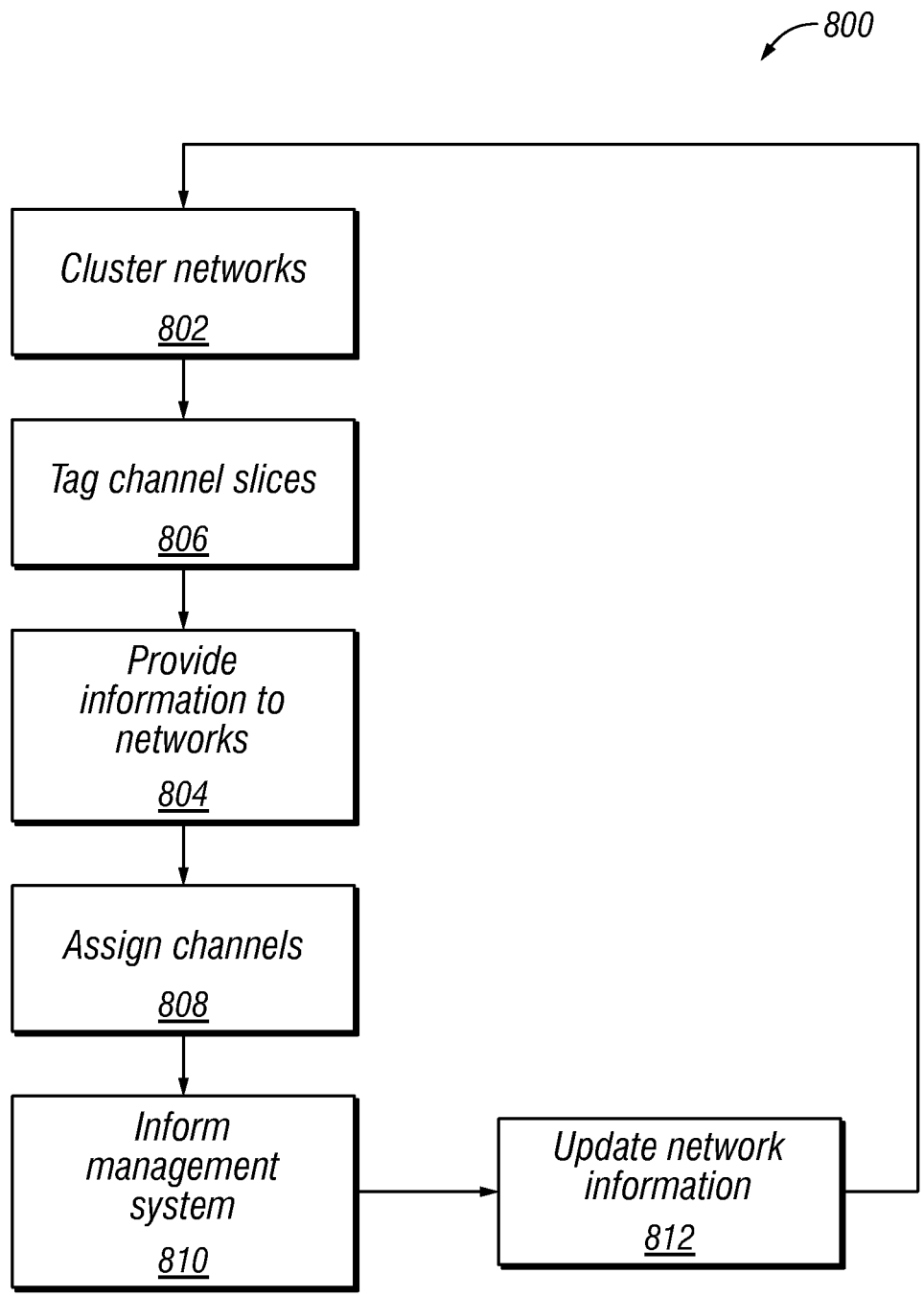
FIG. 8 illustrates a flowchart of an example method for assigning channels for mobile spectrum handoff and coexistence management in a decentralized environment, in accordance with certain embodiments of the present disclosure.

FIG. 8 illustrates a flowchart of an example method 800 for assigning channels for mobile spectrum handoff and coexistence management in a decentralized environment, in accordance with certain embodiments of the present disclosure. Method 800 includes clustering the networks, channel tagging, providing information, reserving slices of P-band and supplementing with slices of S-band.

According to one embodiment, method 800 preferably begins at step 802. Teachings of the present disclosure may be implemented in a variety of configurations. As such, the preferred initialization point for method 800 and the order of steps 802-812 comprising method 800 may depend on the implementation chosen.

At step 802, method 800 may begin clustering the networks into different sets. For example, method 800 may establish $Set_a$ as the set of networks for which the whitespace bands are available at location 604 and $Set_u$ as the set of networks for which the whitespace bands are unavailable at location 604. After establishing these initial sets, method 800 may then order the networks according to the results of establishing $Set_a$ and/or $Set_u$. After ordering the networks, method 800 may proceed to step 806.

At step 806, method 800 may tag the channel slices as to whether they belong to either the P-band or the S-band, as described in more detail above with reference to FIGS. 6-7. After tagging the channel slices, method 800 may continue to step 804.

At step 804, method 800 may provide information from management system 200 to radio networks 102. As described in more detail above with reference to FIGS. 1-7, this information may include the operating frequencies, occupancy, network type, and interference levels of radio networks 102. This information may also include the status of spectrum availability, e.g., whether a given radio network 102 is in $Set_a$ or $Set_b$. After providing this information, method 800 may proceed to step 808.

At step 808, method 800 may assign channels based on a reward value assigned to each channel slice. For example, a reward value may be calculated by taking into account an interference cost and a handoff cost. The number of slices from the P-band assigned to a particular radio network 102 may be denoted as "$NP_u$" and may be calculated as $$\frac{\text{\# of P-band slices}}{\text{\# of interfering network} \in Set_u}.$$

For example, a lightly loaded network requiring less bandwidth than $NP_u$ may use slices from the P-bands. In comparison, a heavily loaded network requiring more bandwidth than $NP_u$ may use $NP_u$ number of slices from the P-band and slices from S-band for aggregation and/or bonding. Further, lightly loaded but S-band slices may have better quality. In that situation, method 800 may use one slice from P-band for seamless connectivity and other slices from S-band for throughput. After assigning channels, method 800 may proceed to step 810.

At step 810, method 800 may inform management system 200 of the channels allocated, as described in more detail above with reference to FIGS. 3-7. Once management system 200 has been informed, method 800 may proceed to step 812.

At step 812, method 800 may update data associated with a given radio network 102, as described in more detail above with reference to FIGS. 3-7. Once this data is updated, method 800 may return to step 802 to begin the process again.

In some embodiments, the steps of method 800 may be performed by some or all of the components of system 100, as described in more detail above with reference to FIGS. 1-7. For example, in some configurations, neighbor detection engine 210 may be responsible for gathering and reporting data on neighboring radio networks 102. As another example, in some configurations, a WSO and/or radio network 102 may make a decision on what channels to use based on received information, as described in more detail above with reference to step 808. In other configurations, these steps may be performed by different components of systems 100, 600 without departing from the scope of the present disclosure.

Although FIG. 8 discloses a particular number of steps to be taken with respect to method 800, method 800 may be executed with more or fewer steps than those depicted in FIG. 8. For example, in some embodiments, the channel assignment described in more detail above with reference to step 808 may be iterative process for which negotiation may be revisited as the channel assignment for each radio network 102 is instituted. In addition, although FIG. 8 discloses a certain order of steps comprising method 800, the steps comprising method 800 may be completed in any suitable order. For example, due to the iterative nature of the algorithm, multiple steps of method 800 may occur simultaneously.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the invention.

What is claimed:

1. A management system for spectrum handoff in a plurality of radio networks, the plurality of radio networks configured to operate over a shared spectrum, the management system comprising:
    a processor;
    a neighbor detection engine communicatively coupled to the processor, the neighbor detection engine configured to:
        gather a first plurality of data associated with a first location; and
        gather a second plurality of data associated with a second location;
    a load analysis engine communicatively coupled to the processor, the load analysis engine configured to determine a load level associated with a first set of radio networks and a second set of radio networks of the plurality of radio networks,
    a spectrum analysis engine communicatively coupled to the processor, the spectrum analysis engine configured to determine a bandwidth allocation value based on the load level; and
    a channel slicing engine communicatively coupled to the processor, the channel slicing engine configured to:
        generate a channel table from the first plurality of data and the second plurality of data, the channel table comprising:
            a first channel set comprising channels of the shared spectrum available at both the first location and the second location; and
            a second channel set comprising channels of the shared spectrum available at the first location and unavailable at the second location; and
        order the first set of radio networks and the second set of radio networks based on the bandwidth allocation value, data associated with the first channel set, and data associated with the second channel set.

2. The system of claim 1, wherein the first location and the second location are associated with a predetermined route.

3. The system of claim 1, wherein the channel slicing engine is further configured to:
    receive a plurality of mobility data, the plurality of mobility data associated with a white space object; and
    estimate the second location based on the plurality of mobility data.

4. The system of claim 3, wherein the plurality of mobility data includes data associated with one or more of a speed of the white space object, a direction of the white space object, or a mobility state of the white space object.

5. The system of claim 3, wherein the plurality of mobility data is received during registration of the white space object to the management system.

6. The system of claim 3, wherein the plurality of mobility data is received during reconfiguration of the white space object.

7. The system of claim 3, wherein the plurality of mobility data is received during a response from the white space object to an information request from the management system.

8. The system of claim 1, further comprising a radio network of the plurality of radio networks, the radio network configured to:
    determine a load level;
    determine a bandwidth allocation value based on the load level;
    receive the channel table; and
    select a one or more channel slices from the channel table based on the bandwidth allocation value and a score associated with each of the one or more channel slices.

9. The system of claim 8, wherein the channel score is based on data associated with the first channel set and the second channel set.

10. The system of claim 1,
    wherein the first set of radio networks comprises radio networks operable over the second channel set at the first location and not the second location and the second set of radio networks comprises radio networks operable over the first and second channel sets.

11. The system of claim 1, wherein the channel slicing engine is further configured to reserve one or more channel slices from the first channel set to preserve wireless connectivity for the first set of radio networks.

12. The system of claim 1, wherein the management system is compatible with IEEE 802.19.1.

13. A method for spectrum handoff in a plurality of radio networks, the plurality of radio networks configured to operate over a shared spectrum, the method comprising:
    gathering a first plurality of data associated with a first location;

gathering a second plurality of data associated with a second location;
generating a channel table from the first plurality of data and the second plurality of data, the channel table comprising:
   a first channel set comprising channels of the shared spectrum available at both the first location and the second location; and
   a second channel set comprising channels of the shared spectrum available at the first location and unavailable at the second location;
determining a load level associated with a first set of radio networks and a second set of radio networks of the plurality of radio networks;
determining a bandwidth allocation value based on the load level; and
ordering the first set of radio networks and the second set of radio networks based on the bandwidth allocation value, data associated with the first channel set, and data associated with the second channel set.

14. The method of claim 13, wherein the first location and the second location are associated with a predetermined route.

15. The method of claim 13, further comprising:
receiving a plurality of mobility data, the plurality of mobility data associated with a white space object; and
estimating the second location based on the plurality of mobility data.

16. The method of claim 15, wherein the plurality of mobility data includes data associated with one or more of a speed of the white space object, a direction of the white space object, or a mobility state of the white space object.

17. The method of claim 15, wherein the plurality of mobility data is received during registration of the white space object to the management system.

18. The method of claim 15, wherein the plurality of mobility data is received during reconfiguration of the white space object.

19. The method of claim 15, wherein the plurality of mobility data is received during a response from the white space object to an information request from the management system.

20. The method of claim 13, further comprising:
determining a load level;
determining a bandwidth allocation value based on the load level;
receiving the channel table; and
selecting a one or more channel slices from the channel table based on the bandwidth allocation value and a score associated with each of the one or more channel slices.

21. The method of claim 20, wherein the channel score is based on data associated with the first channel set and the second channel set.

22. The method of claim 13,
wherein the first set of radio networks comprises radio networks operable over the second channel set at the first location and not the second location, and the second set of radio networks comprises radio networks operable over the first and second channel sets.

23. The method of claim 13, further comprising reserving one or more channel slices from the first channel set to preserve wireless connectivity for the first set of radio networks.

24. The method of claim 13, wherein the method is compatible with IEEE 802.19.1.

* * * * *